Patented June 6, 1950

2,510,543

UNITED STATES PATENT OFFICE 2,510,543

PROCESS OF DRYING FOOD

Henry Borsook, Pasadena, Calif., assignor of one-half to Aaron Sapiro, Los Angeles, Calif.

No Drawing. Application May 16, 1949,
Serial No. 93,630

2 Claims. (Cl. 99—204)

My invention relates to processes of drying food and included in the objects of my invention are:

First, to provide a process of drying food wherein enzyme activity during drying of the food is reduced to a minimum thereby reducing spoilage and discoloration both during the drying period and subsequent storage.

Second, to provide a process of drying food wherein the food is pretreated with an enzyme destroying and bactericidal substance which completely decomposes into gases capable of complete removal during the drying period so that the resultant product is entirely free of such substance.

Third, to provide a process of drying food wherein the tendency of the food particles sticking together is minimized.

With the above and other objects in view, my process involves generally the steps of:

First, peeling, slicing and physically preparing the food to be dried, until in the form of dice, slices or other desired shape; then Second, soaking the food in a solution comprising 5 parts by weight of trichloracetic acid and 100 parts by weight of water, at room temperature (22° centigrade) for fifteen minutes; then Third, straining of excess water and drying the food at room temperature (22° centigrade) for 24 hours; then Fourth, subjecting the food to a dehydrating atmosphere and a temperature above the boiling point of water.

Step 1 may follow conventional practice in the drying of food; that is, for purposes of my invention the size and form is dictated by the character of the food and the desired form of the dried product. Practically all food which is at present capable of being dried or dehydrated may be employed in my process. In addition other foods which because of high enzyme content and tendency to spoil, have not been successfully dehydrated, may be employed successfully in my process.

Step 2. The percentage of trichloracetic acid may vary from 1% to 2% to as much as 10% or 15%. The optimum quantity is determined by the character and virility of the bacteria or enzyme factors in the food, as well as the duration and temperature employed in drying. The longer the duration and higher the temperature, the greater percentage of trichloracetic acid may be used. The optimum minimum quantity is that which effects complete inhibition of bacteria and enzyme activity, as determined by inspection of the dehydrated product and test of its storage qualities. The maximum quantity is determined by complete decomposition of the trichloracetic acid. This acid decomposes into carbon dioxide and chloroform, both gases which are readily dissipated. Presence of these gases or the acid itself in the finished product indicates that the quantity of acid is too high, or the dehydration period too short or the temperature too low.

Step 3 is not critical, in fact it may be omitted.

Step 4 is, of itself, conventional and is dictated by standard practice for the food being treated. That is, the time may be long or short, the temperature low (above the boiling point of water however) or high depending upon the conditions of treatment which the food will tolerate.

The presence of gases liberated during the decomposition of the trichloracetic acid has the effect of reducing the tendency of the product particles to stick together.

It is believed that trichloracetic acid is uniquely suited for the purposes of my process. This acid is particularly effective as an enzymecide as well as a bactericide, and because it completely decomposes under the conditions to effect dehydration leaving no residue, full advantage of enzyme and bacteria inhibition is obtained without altering the finished product. Tests reveal that the product is remarkably free of discoloration and that the storage life of the product is increased substantially. While my process is particularly suitable for vegetables it may be used to process other food such as fruit, meat, fish, milk and eggs.

Having fully described my invention, it is to be understood that I do not wish to be limited to the details herein set forth, but my invention is of the full scope of the appended claims.

I claim:

1. The process of dehydrating food characterized by: pretreating the food with a water solution of trichloracetic acid to destroy the enzyme and bacteria in said food; then dehydrating the food until substantially free of said acid.

2. The process of dehydrating food characterized by: pretreating food with a water solution of trichloracetic acid in the amount of water 100 parts by weight, acid two to fifteen parts by weight; then dehydrating the food until substantially free of said acid.

HENRY BORSOOK.

REFERENCES CITED

The following references are of record in the file of this patent:

UNITED STATES PATENTS

| Number | Name | Date |
|---|---|---|
| 116,729 | Lowe | July 4, 1871 |
| 611,017 | Neumann | Sept. 20, 1898 |
| 1,311,709 | Plaisance | July 29, 1919 |
| 2,011,465 | Balls | Aug. 13, 1935 |
| 2,472,017 | Iungerich | May 31, 1949 |